United States Patent [19]
Folci

[11] Patent Number: 5,464,184
[45] Date of Patent: Nov. 7, 1995

[54] SAW BLADE MOUNTING APPARATUS

[75] Inventor: Giovanni A. Folci, Briosco, Italy

[73] Assignee: Black & Decker Inc., Newark, Del.

[21] Appl. No.: 111,748

[22] Filed: Aug. 25, 1993

[30] Foreign Application Priority Data

Aug. 28, 1992 [GB] United Kingdom ............... 9218343

[51] Int. Cl.⁶ ............................................... B27G 5/02
[52] U.S. Cl. ............................................ 248/425; 83/666
[58] Field of Search ................................. 248/415, 418,
248/425, 424; 83/666, 698.51, 699.51;
74/567, 568, 569

[56] References Cited

U.S. PATENT DOCUMENTS

| | | | |
|---|---|---|---|
| 2,650,648 | 9/1953 | Nordmark et al. | 248/418 |
| 2,930,415 | 3/1960 | Cravens | 143/6 |
| 4,184,395 | 1/1980 | Blachly et al. | 83/486.1 |
| 4,226,152 | 10/1980 | Bies | 83/764 |
| 4,802,706 | 2/1989 | Onimaru et al. | 296/68 |
| 4,862,781 | 9/1989 | Lauffer | 83/477.1 |
| 5,239,906 | 8/1993 | Garuglieri | 83/471.3 |

FOREIGN PATENT DOCUMENTS

| | | |
|---|---|---|
| 0119890 | 9/1984 | European Pat. Off. . |
| 0339177 | 1/1989 | European Pat. Off. . |
| 0297469 | 1/1989 | European Pat. Off. . |

Primary Examiner—Blair M. Johnson
Assistant Examiner—Catherine S. Collins
Attorney, Agent, or Firm—Charles E. Yocum; Dennis A. Dearing; Frederick Voss

[57] ABSTRACT

An apparatus for mounting a device, such as a saw blade, on a base (3) to enable the blade to be positioned accurately in either of two distinct positions relative to the base. The apparatus comprises a pivot member (21) for supporting the blade (not shown) pivotally mounted on a fixed member (11). The fixed member (11) includes a pair of abutments (142,144) and the pivot member has at least one asymmetric stop (160) for abutting the abutments (142,144) after rotation of the pivot member (21) relative to the fixed member to define the distinct positions of the blade. These positions are defined generally by the positions of the abutments (142,144) and accurately by the orientation of the or each asymmetric stop (160). The apparatus may further include a device (170) for adjusting accurately one of the distinct positions by a predetermined amount.

21 Claims, 3 Drawing Sheets

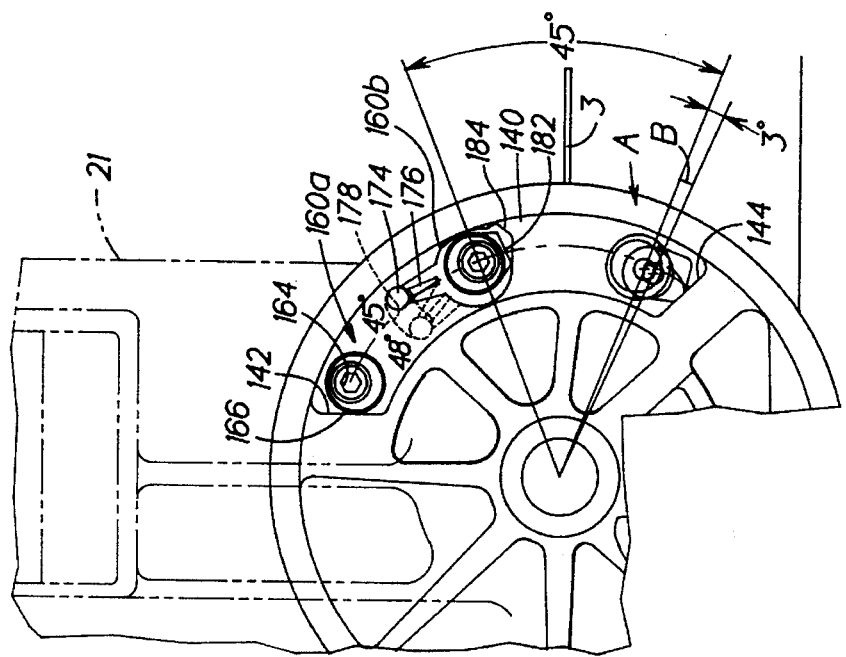

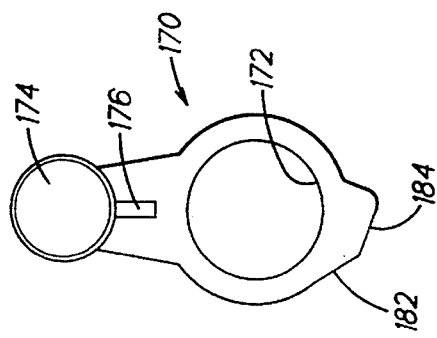
FIG. 7c
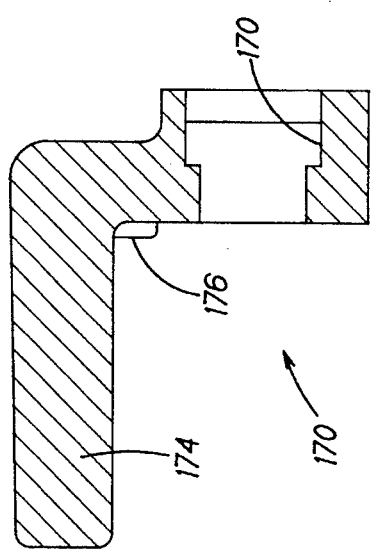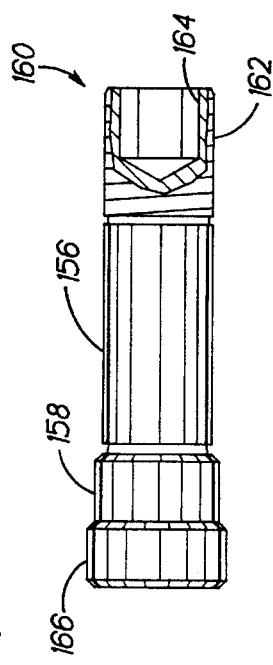
FIG. 7b
FIG. 8b
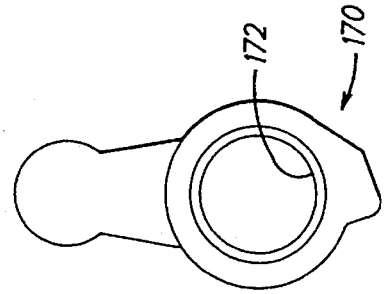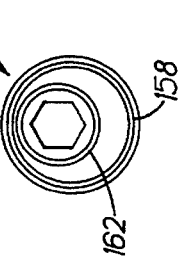
FIG. 7a
FIG. 8a

SAW BLADE MOUNTING APPARATUS

BACKGROUND OF THE INVENTION

This invention relates to apparatus for mounting a device on a base to enable the device to be positioned accurately in either of two distinct positions relative to the base. The invention is particularly applicable to a bevel saw or the like, wherein a saw blade must be accurately positioned relative to a surface supporting a workpiece during cutting of the workpiece.

In a bevel saw, the blade is either vertical or at some angle to the vertical, usually up to 45°. It is moved in the plane of the blade to cut a workpiece oriented on a horizontal table.

There are two normal positions: that is to say, the vertical position for cutting right-angle cuts in the workpiece and 45° for making mitre cuts for joining two similarly cut pieces at right angles.

With such normal cuts it is desirable to arrange two limit stops, so that the saw can quickly and easily be adjusted to either position. Hitherto these have consisted simply of bolts or the like screwed into housings which bolts can be adjusted to accommodate any manufacturing tolerances in the saw parts. It is an object of the present invention to provide an apparatus which improves upon existing arrangements.

SUMMARY OF THE INVENTION

With the foregoing in mind, the present invention provides an apparatus for mounting a device on a base to enable the device to be positioned accurately in either of two distinct positions relative to the base, the apparatus comprising a pivot member for supporting the device pivotally mounted on a fixed member of the base, the pivot member and the fixed member including a pair of abutments and at least one asymmetric stop for abutting the abutments after rotation of the pivot member relative to the fixed member to define the distinct positions of the device, wherein the two distinct positions are defined generally by the positions of the abutments and accurately by the orientation of each asymmetric stop. Hence, if the device is a circular saw or the like and the base is a base table upon which a workpiece is to be positioned, two cuts at exactly 45° (for example) to each other can be readily achieved.

Preferably the abutments are defined by end walls of a segmental channel, which extends around the pivot axis of the apparatus.

The segmental channel may be formed on the fixed member and each asymmetric stop is then mounted on the pivot member. Alternative arrangements can, of course, also be envisaged.

Each asymmetric stop may comprise a shaft and an eccentric head at one end thereof. Preferably the shaft of each asymmetric stop passes through the pivot member (or the fixed member) so that the orientation of the eccentric head can be adjusted from the side of the pivot member opposite to the head simply by rotating the shaft.

Each asymmetric stop is preferably fixed to the pivot member (or the fixed member) by a locking nut on the end of the stop distal from the eccentric head.

Preferably two asymmetric stops are provided, one abutting one abutment in a first of the two distinct positions and the other abutting the other abutment in the second of the two distinct positions. By including two asymmetric stops, further flexibility is provided in adjusting the positions of the two distinct positions.

In one embodiment of the present invention, the distinct positions are separated by an angle of approximately 45° about the pivot axis. Clearly any other desired angle could be achieved, simply by changing the relative positions of the abutments.

In any event, a saw incorporating this, or indeed any prior art arrangement is normally limited to movements between zero and 45° If greater angles are required then the workpiece must be turned over and cut from the other direction so that the saw is then limited between 45° and a right-angle.

However, it may not always be possible or easy to mm the workpiece around. Moreover, it is likely that the desired cut may be only a little more than 45°, as is typically the case when nitring workpieces to form joints to fit in older houses, where walls, floors and ceilings never seem exactly to meet at right angles.

Thus it is a further object of the present invention to provide apparatus which overcomes this problem, or which at least mitigates its effects.

According to another aspect of the present invention, there is provided an apparatus for mounting a device on a base to enable the device to be positioned accurately in either of two distinct positions relative to the base, the apparatus comprising a pivot member for supporting the device pivotally mounted on a fixed member of the base, an abutment on one of the pivot member or the fixed member and a camming device on the other of the pivot member or the fixed member for abutting the abutment to define the relative positions of the pivot member and the fixed member about the pivot axis, wherein the camming device includes two surfaces which, when brought into contact with the abutment, accurately define two predetermined distinct positions of the pivot member relative to the fixed member.

Preferably the camming device includes means for holding the chosen surface in contact with the abutment. The holding means may comprise a pimple on the camming device for engaging a dimple in the pivot member or fixed member, as appropriate. Other holding means can, of course, also be envisaged.

The two positions of the pivot member are preferably separated by an angle of approximately 3° about the pivot axis. This angle depends on the relative positions of the two surfaces of the camming device, and can be adjusted by altering the camming device accordingly.

As will be appreciated, if the camming device includes more than two working surfaces, additional distinct positions of the pivot member relative to the fixed member may be provided.

Preferably the camming device is mounted on the pivot member and the abutment is formed on the fixed member.

The camming device may include a knob extending through a window of the pivot member to facilitate changing of the surface in contact with the abutment.

The camming device is preferably mounted on a stub such that the camming device pivots about the stub axis to change the surface in contact with the abutment. In a particularly preferred embodiment of the present invention, the stub is the eccentric head of an asymmetric stop of an apparatus as herein described.

Although the present invention is particularly applicable to an apparatus for mounting a circular saw on a base table to provide accurate cutting of a workpiece on the table by the saw, the invention may be applied to any other appropriate situation.

BRIEF DESCRIPTION OF THE DRAWINGS

The present invention is now described, by way of example only, with reference to the accompanying drawings, in which:

FIG. 5 is a more detailed, cut-away view of FIG. 2;

FIG. 6 is a super-imposed view of the pivot member on the pivot block, from the rear;

FIGS. 7a, b and c are end view, a sectional side view and a view of the other end of a cam stop sleeve of the saw; and FIGS. 8a and b are end and side views of eccentric bevel stops.

DETAILED DESCRIPTION OF A PREFERRED EMBODIMENT

Figure 1:
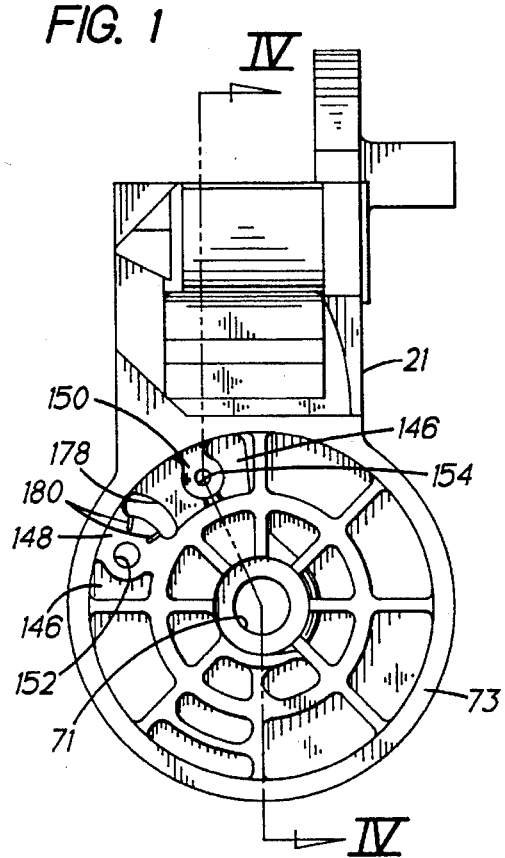
FIG. 1 is a front view of the pivot member of an apparatus according to the present invention.
Figure 2:
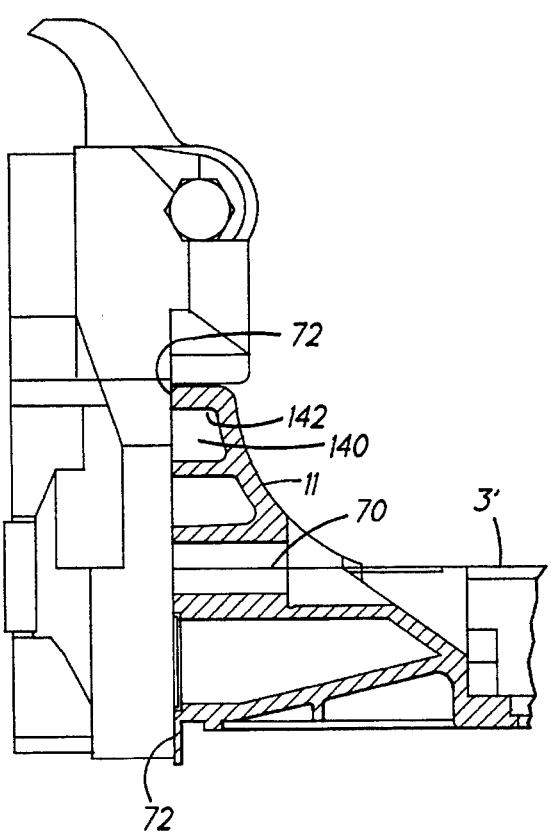
FIG. 2 is a side view of the pivot member connected to the back of a round table of a saw, which is in section along the line II—II in FIG. 3.
Figure 3:
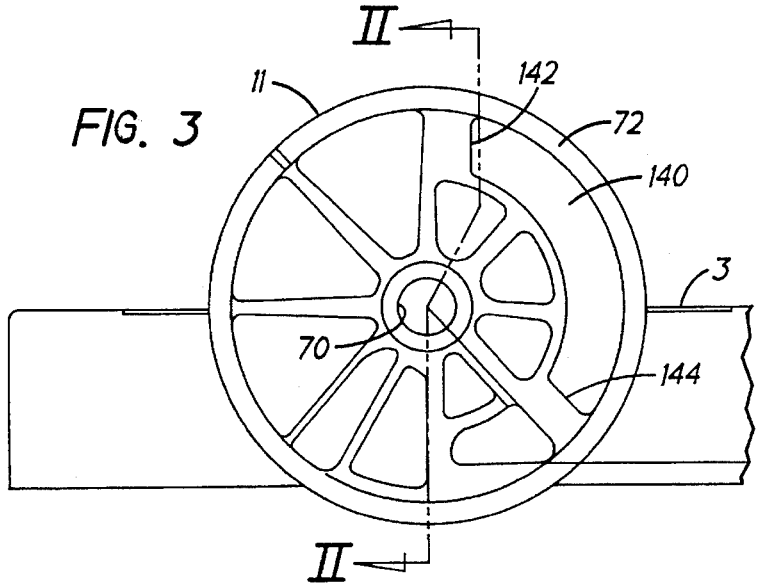
FIG. 3 is a back view of the round table showing its pivot block.
Figure 4:
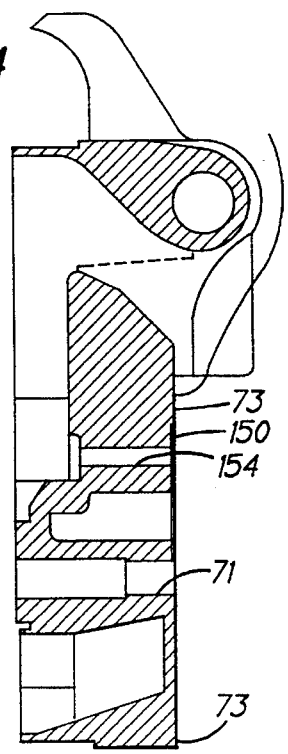
FIG. 4 is a section along the line IV—IV in FIG. 1.

With reference to the drawings, a pivot member 21 for receiving a circular saw (not shown) is connected to a pivot block 11 of a round table 3 for relative rotation about axis 70/71. The pivot member 21 has an annular surface 73 for flush engagement with a similar face 72 on the pivot block 11.

In the body of the pivot block 11 is formed a segmental part-annular channel 140, which has two end walls 142,144. In the same mating region of the pivot member 21, in a similar segmental part-annular channel 146 in its body, are formed two bosses 148, 150.

The bosses 148,150 each have a central bore 152,154 respectively, each adapted to receive, in a close fit, a shaft 156 of a bevel stop 160 (see FIGS. 5 and 8). The shaft 156 has an eccentric cylindrical head 158 at one end and is threaded at its other end 162. The threaded end 162 has a hexagonal socket 164 formed therein. The head 158 has a bearing surface 166 formed thereon.

With reference to FIG. 5, a bevel stop 160 is fitted in each bore 152,154 from the front of the pivot member 21 before the pivot member 21 is mated with the pivot block 11. A nut (not shown) is screwed on the end 162 to lock the stop 160 in place.

When the pivot block 11 and pivot member 21 are mated, the heads 158 of the stops 160 project into the channel 140 of the pivot block 11.

The boss 150 and the wall 142 of the channel 140 are so arranged that when a stop 160a (see FIG. 6) is received in the bore 154, the bearing surface 166 of the head 158 abuts the wall 142 when the pivot member 21 is vertical with respect to the pivot block 11 on the round table 3, assuming, of course, that the latter is horizontal.

To allow for manufacturing tolerances, the verticality of the saw blade (not shown) needs to be adjustable and this is provided by the eccentricity of the head 158. A key inserted in hexagonal socket 164 enables the shaft 156 to be rotated, once the nut (not shown) is slackened from the threaded end 162. Rotation of the shaft 156 changes the disposition of the bearing surface 166 of the stop 160a relative to the end wall 142 so that precise verticality of the blade can be assured.

The other stop 160b is essentially the same construction as stop 160a except that, before it is inserted in the bore 152 of the pivot member 21, a cam stop sleeve 170 may be slipped over the head 158 and bearing surface 166. The cam sleeve 170 has a bore 172 having diameters corresponding with the head 158 and surface 166 so that it is a close fit on the stop 160b.

The pivot member 21 has an arcuate window 178 which is centred on the bore 152. A knob 174 of the cam stop sleeve 170 is arranged to project through the window 178 when the sleeve is
located on the bevel stop 160b such that the knob 174 is actuable from behind the pivot member 21. A pimple 176 formed on the cam stop sleeve 170 is adapted to co-operate with one of two dimples 180 in the face of the pivot member 21 on the boss 148.

The cam stop sleeve 170 has two flat surfaces 182, 184 opposite the knob 174.

Referring to FIG. 6, the bevel stop 160b is in the position shown when the pivot member 21 is supporting the saw blade vertically relative to the table 3. When it is desired to cut bevels in a workpiece positioned on the table 3, the pivot member 21 and hence the saw blade is pivoted (clockwise in FIG. 6) up to 45° relative to the pivot block 11. This brings the stop 160b to the position shown at A in FIG. 6. Here one of the surfaces 182,184 of the cam sleeve 70 abuts the end wall 144 of the channel 140.

The surfaces 182,184 are arranged so that there is a small angular difference B between them, in terms of the extent to which the pivot member 21 is allowed to pivot with respect to the pivot block 11. Which surface 182,184 engages the wall 144 depends on the position of knob 174 of the cam sleeve 170. As mentioned above, the cam sleeve 170 has two positions, which in FIG. 6 are labelled 45° and 48°. In the 45° position, the surface 184 is positioned so that it contacts the wall 144. The boss 148 (and its bore 152) and the wall 144 are so arranged that in this position the pivot member 21 is about 45° to the table 3. However, to allow for manufacturing tolerances, the stop 160b is rotatable in its bore 152 to alter marginally the limit of movement so that 45° can be set precisely for each saw.

Having set 45° with some accuracy, it is then possible to rotate the knob 174, springing the pimple 176 out of engagement with the first dimple 180 (i.e. that one in the 45° position), to the second position (48°) where the pimple 176 snaps into engagement with the second dimple 180 in that position. In this position it is the surface 182 of the cam sleeve 170 which abuts the end wall 144 and, because this surface 182 is closer to the axis of the bore 152, an extra three degrees precisely of bevel pivot is provided.

It will of course be understood that the present invention has been described above purely by way of example, and that modifications of detail can be made within the scope of the invention.

I claim:

1. An apparatus for mounting a saw blade on a base to enable the saw blade to be positioned accurately in either of two distinct positions relative to the base, comprising:

a pivot member for supporting the saw blade;

a base including a fixed member;

the pivot member being pivotally mounted on the fixed member about a pivot axis of the apparatus;

a segmented channel formed in the fixed member and having end walls defining abutments which extend around the pivot axis of the apparatus;

at least one asymmetric stop attached to the pivot member for abutting the abutments after rotation of the pivot member about the pivot axis relative to the fixed member to define the two distinct positions of the saw blade;

and wherein said at least one asymmetric stop further includes a shaft having a first end and a second end, the first end having an eccentric head.

2. An apparatus as claimed in claim 1, wherein the two distinct positions are defined generally by the positions of the abutments and more accurately defined by orienting the eccentric head of said at least one asymmetric stop.

3. An apparatus as claimed in claim 1, wherein two asymmetric stops are provided, one for each distinct position.

4. An apparatus as claimed in claim 1, wherein the two distinct positions are separated by approximately 45 degrees.

5. An apparatus as claimed in claim 1, wherein said at least one asymmetric stop is fixedly connected to the pivot member by a locking nut on the second end of the shaft.

6. An apparatus as claimed in claim 3, wherein one of the two asymmetric stops further includes a camming device for effecting relatively small adjustments to one of said distinct positions.

7. An apparatus as claimed in claim 6, wherein said small adjustments effected by said camming device are predetermined.

8. An apparatus as claimed in claim 7, said camming device further comprising:

a camming sleeve having a bore;

said bore being sized to slip over the eccentric head of said one of said asymmetric stops;

a knob attached to said cam sleeve for actuating said two predetermined adjustments;

a pimple formed on said cam sleeve that mates with one of two dimples formed in said pivot member to hold said cam sleeve in place; and said dimples correspond to said predetermined adjustments.

9. An apparatus as claimed in claim 4, wherein said dimples are separated by a predetermined distance, said distance representing an arcuate adjustment of the pivot member of approximately 3 degrees.

10. An apparatus as claimed in claim 8, wherein said camming device has two surfaces which when brought into contact with the abutment define two predetermined distinct adjustments, said surfaces being held in their respective contact by the mating of one of said pimples and one of two dimples.

11. An apparatus for mounting a saw blade on a base to enable the saw blade to be positioned accurately in either of two distinct positions relative to the base, the apparatus comprising:

a pivot member for supporting the saw blade;

a base including a fixed member;

the pivot member being pivotally mounted on the fixed member about a pivot axis of the apparatus;

a segmented channel formed in the fixed member and having end walls defining two abutments which extend around the pivot axis of the apparatus;

two asymmetric stops attached to the pivot member for abutting a respective abutment after rotation of the pivot member about the pivot axis relative to the fixed member to define two distinct positions of the saw blade;

and a camming device attached to one of said two asymmetric stops for effecting relatively small adjustments to the position of the saw blade.

12. An apparatus as claimed in claim 11, wherein said camming device has two surfaces that contact the abutment of said one of said two asymmetric stops to define two adjustments.

13. An apparatus as claimed in claim 12, wherein said camming device includes means for holding the camming device in a desired orientation to expose one of the two surfaces of said camming device to the abutment of said one of said two asymmetric stops.

14. An apparatus as claimed in claim 13, wherein the holding means comprise a pimple on the camming device for engaging one of two dimples in the pivot member.

15. An apparatus as claimed in claim 14, wherein the dimples are separated such that their engagement with the pimple causes an adjustment of 3 degrees in the pivot member.

16. An apparatus as claimed in claim 11, wherein said camming device is sized to fit over said one of said asymmetric stops.

17. An apparatus as claimed in claim 11, wherein said asymmetric stops further comprise:

a shaft having a first end and a second end, said first end having an eccentric head.

18. An apparatus as claimed in claim 17, wherein said camming device is sized to fit over the eccentric head of said one of said asymmetric stops.

19. An apparatus as claimed in claim 17, said camming device further comprising:

a camming sleeve having a bore;

said bore being sized to slip over the eccentric head of said one of said asymmetric stops;

a knob attached to said cam sleeve for actuating said relatively small adjustments;

a pimple formed on said cam sleeve that mates with at least one dimple formed in said pivot member to hold said cam sleeve in place; and wherein said at least one dimple corresponds to said relatively small adjustments.

20. An apparatus as claimed in claim 19, wherein said knob projects through an arcuate window formed in said pivot member, said knob being used to actuate the camming device and thereby cause said relatively small adjustment.

21. An apparatus as claimed in claim 19, wherein there are two dimples which are separated such that their engagement with a pimple causes an adjustment of 3 degrees in the pivot member.

\* \* \* \* \*